United States Patent
Wu (10) Patent No.: US 7,147,242 B2
(45) Date of Patent: Dec. 12, 2006

(54) FOLDING MECHANISM FOR A FRONT WHEEL OF A GOLF CART

(75) Inventor: Fang-Li Wu, Tainan Hsien (TW)

(73) Assignee: Sports World Enterprise Co., Ltd., Tainan Hsien (TW)

( * ) Notice: Subject to any disclaimer, the term of this patent is extended or adjusted under 35 U.S.C. 154(b) by 309 days.

(21) Appl. No.: 10/950,379

(22) Filed: Sep. 28, 2004

(65) Prior Publication Data

US 2006/0082105 A1     Apr. 20, 2006

(51) Int. Cl.
*B62B 3/02* (2006.01)

(52) U.S. Cl. .................. 280/641; 280/651; 280/DIG. 6

(58) Field of Classification Search .................. 280/38, 280/641, 642, 651, 62, DIG. 6
See application file for complete search history.

(56) References Cited

U.S. PATENT DOCUMENTS

| | | | | |
|---|---|---|---|---|
| 4,289,324 | A * | 9/1981 | Nemeth | 280/38 |
| 6,698,789 | B1 * | 3/2004 | Reimers et al. | 280/651 |
| 6,719,319 | B1 * | 4/2004 | Liao | 280/654 |
| 6,969,078 | B1 * | 11/2005 | Liao | 280/38 |
| 7,000,928 | B1 * | 2/2006 | Liao | 280/38 |
| 7,048,283 | B1 * | 5/2006 | Wu | 280/38 |
| 7,048,296 | B1 * | 5/2006 | Wu | 280/651 |
| 2003/0122353 | A1 * | 7/2003 | Liao | 280/651 |
| 2003/0141756 | A1 * | 7/2003 | Liu | 301/111.06 |
| 2005/0121864 | A1 * | 6/2005 | Liao | 280/38 |
| 2005/0121865 | A1 * | 6/2005 | Liao | 280/38 |
| 2005/0258611 | A1 * | 11/2005 | Wu | 280/38 |
| 2005/0269803 | A1 * | 12/2005 | Wu | 280/651 |
| 2006/0071434 | A1 * | 4/2006 | Cheng | 280/47.26 |
| 2006/0097488 | A1 * | 5/2006 | Liao | 280/651 |
| 2006/0192366 | A1 * | 8/2006 | Kimberley | 280/651 |

* cited by examiner

*Primary Examiner*—Jeff Restifo
(74) *Attorney, Agent, or Firm*—Rosenberg, Klein & Lee (57) ABSTRACT

A golf cart includes a frame including two parallel rods, a front wheel, and a mechanism used for displacing the wheel between stretched position and folded one; the mechanism includes two locating members secured to the rods, and a wheel support, which has two bars each passing into a hole of a corresponding locating member, and which has pegs near the bars and projecting into the locating members; each locating member has first and second trenches on two sides of the hole; the holes are shaped such that the bars are linearly displaceable therein; when the bars are in first sections of the holes, the pegs won't engage the trenches, and the wheel support can be turned around one hundred and eighty degrees between folded position and stretched one; when the bars are displaced to second sections of the holes, the pegs will engage the trenches to secure the wheel support.

4 Claims, 13 Drawing Sheets

FOLDING MECHANISM FOR A FRONT WHEEL OF A GOLF CART

BACKGROUND OF THE INVENTION

1. Field of the Invention

The present invention relates to a foldable front wheel of a golf cart, more particularly one, which can be securely held in stretched position for allowing the golf cart to move along smoothly, and can be easily unlocked and smoothly moved between the stretched position and the folded position without possibility of causing damage to the folding mechanism provided thereto.

2. Brief Description of the Prior Art

Figure 1:
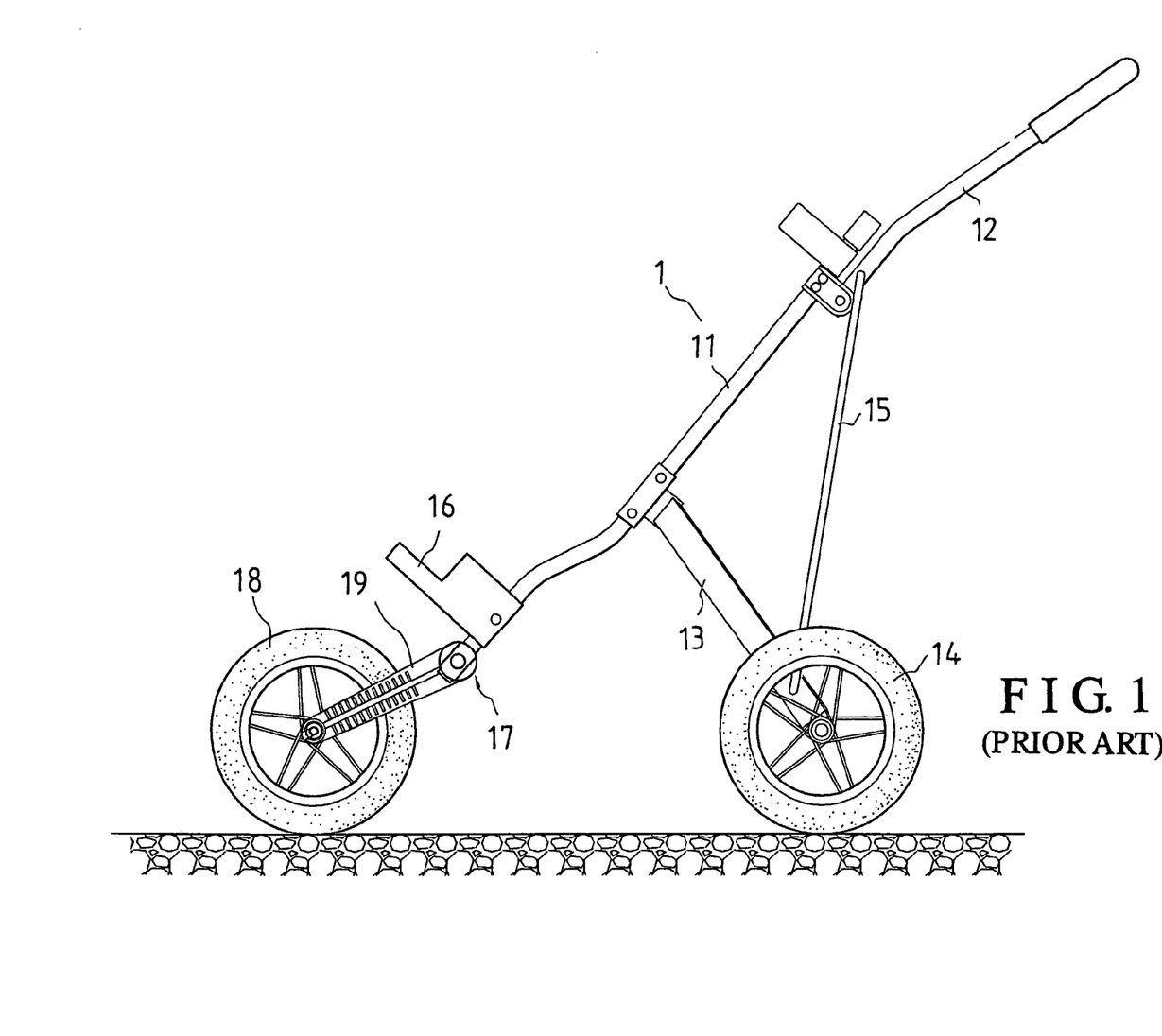
FIG. 1 is a side view of the conventional golf cart.

Referring to FIG. 1, a conventional folding golf cart 1 includes a frame 11, a handle 12 pivoted to an upper end of the frame 11, two rear wheel supports 13 pivoted to a middle portion of the frame 11, rear wheels 14 respectively connected with the rear wheel supports 13, two connecting rods 15, a lower support 16 secured on the frame 11 for supporting a golf bag on, a pivotal mechanism 17 connected with the frame 11, a front wheel support 19, and a front wheel 18 fitted to the front wheel support 19.

Figure 2:
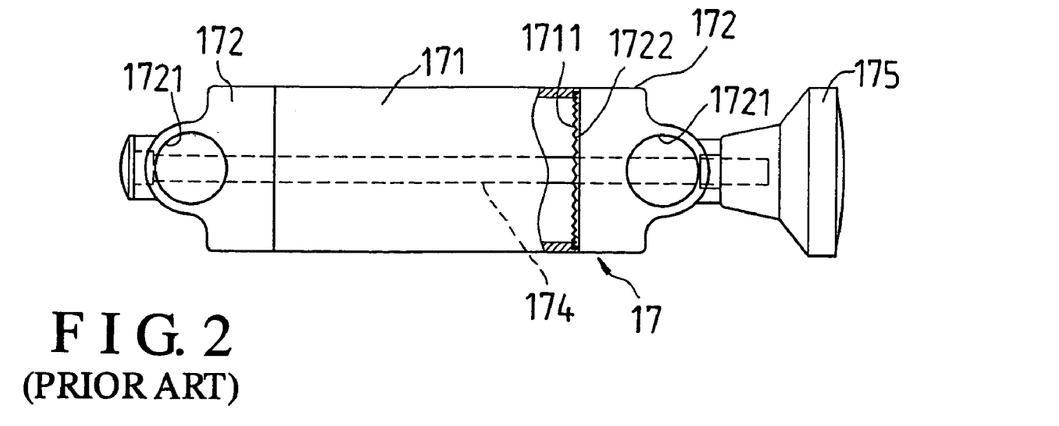
FIG. 2 is a top view of the folding structure for the front wheel of the conventional golf cart.
Figure 3:
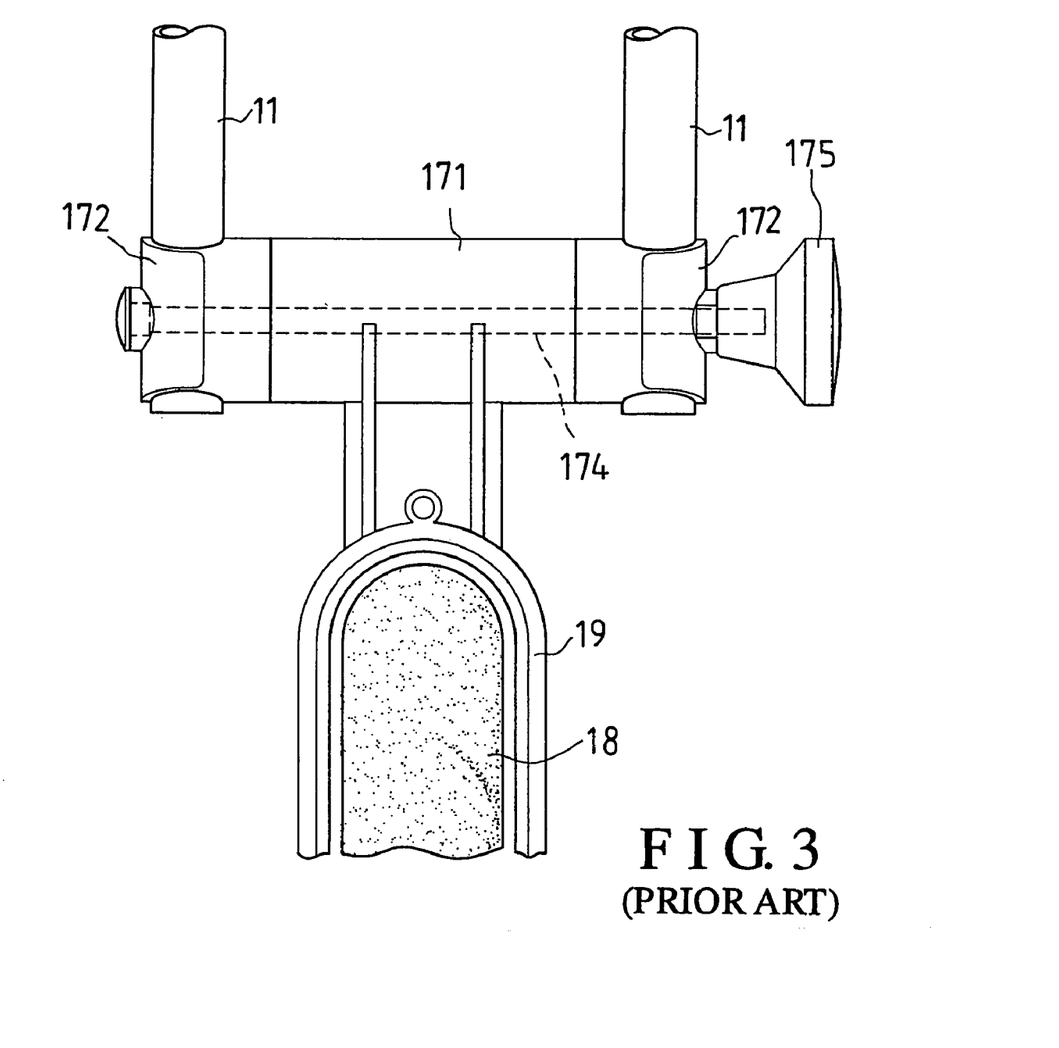
FIG. 3 is front view of the folding structure for the front wheel of the conventional golf cart.

The pivotal mechanism 17 includes a middle pivotal body 171, a pairs of lateral pivotal bodies 172, a bolt 174, and a knob 175; the lateral pivotal bodies 172 have engaging toothed sides 1722, and fitting holes 1721, and are respectively securely joined to lower ends of rod portions of the frame 11 with the lower ends of the frame 11 being passed into the fitting holes 1721, and with the engaging toothed sides 1722 facing each other; the bolt 174 is passed through both of the lateral pivotal bodies 172, and screwed into the knob 175 at a tail end; the middle pivotal body 171 has engaging toothed sides 1711 on two ends, and is arranged between the lateral pivotal bodies 172, and pivoted on the bolt 174 such that it is angularly displaceable relative to the frame 11, and such that the toothed sides 1711 facing respective ones of the toothed sides 1722.

The front wheel support 19 is securely joined to the middle pivotal body 171 to be movable together with the pivotal body 171. Therefore, when the knob 175 is screwed to a tight position, the lateral bodies 172 will be engaged with the middle pivotal body 171 at the toothed sides 1722, and in turns, the wheel support 19 can't move relative to the frame 11. And, when the knob 175 is screwed loose, the lateral bodies 172 will stop engaging the middle pivotal body 171, and in turns, the front wheel 18 can be changed in the orientation relative to the frame 11 together with the middle pivotal body 171. Thus, the front wheel 18 can be secured in a stretched position for use, and can be secured in a folded position when the golf cart 1 isn't used.

However, the pivotal mechanism 17 for the front wheel 18 is found to have disadvantages as followings:

1. Even though the knob 175 has been turned loose, the middle pivotal body 171 can be rubbed against the toothed sides 1722 at the toothed sides 1711 thereof while the front wheel 18 is being displaced relative to the frame 11. Consequently, the engaging toothed sides 1711 and 1722 will be damaged, and the front wheel 18 can't be secured in position any more.
2. The user can turn the knob 175 too much after changing the position of the front wheel 18, and in turns, screw threads of the knob 175 and the bolt 174 will get damaged.
3. The knob 175 can become loose owing to vibration of the golf cart, and in turns, the front wheel 18 will be away from the stretched position while the golf cart is being used.
4. It is difficult for the user to move the front wheel 18 to a same proper stretched position in every stretching action, and also difficult to move the front wheel 18 to a same folded position in every folding action because the golf cart isn't equipped with a mechanism that will stop the middle pivotal body 171 as soon as the front wheel 18 is moved to either of the proper positions.

SUMMARY

It is a main object of the present invention to provide an improvement on a folding structure to a front wheel of a golf cart to overcome the above disadvantages.

The golf cart includes a frame including two parallel rods, a front wheel, and a mechanism used for displacing the wheel between a stretched position and a folded one. The mechanism includes two locating members secured to the rods, and a wheel support, which has two bars each passing into a hole of a corresponding locating member, and which has pegs near the bars and projecting into the locating members. Each locating member has first and second trenches on two sides of the hole; the holes are shaped such that the bars are linearly displaceable therein. When the bars are in first sections of the holes, the pegs won't engage the trenches, and the wheel support can be turned around one hundred and eighty degrees between the folded position and the stretched one. The pegs will engage the trenches to secure the wheel support as soon as the bars are displaced to second sections of the holes after the wheel support has been pivoted to one of the folded position and the stretched position.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 4:
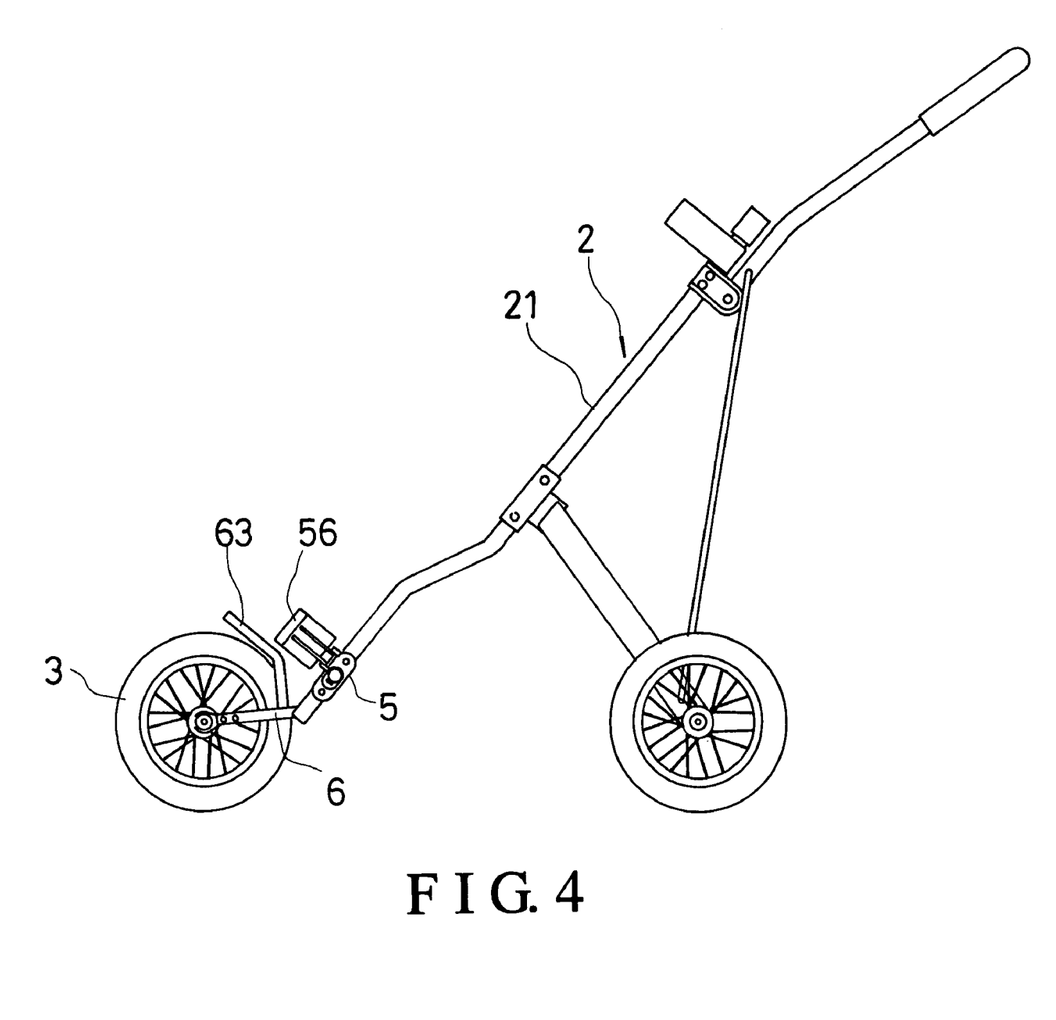
FIG. 4 is a side view of the golf cart of the present invention, with the front wheel in the stretched position.
Figure 5:
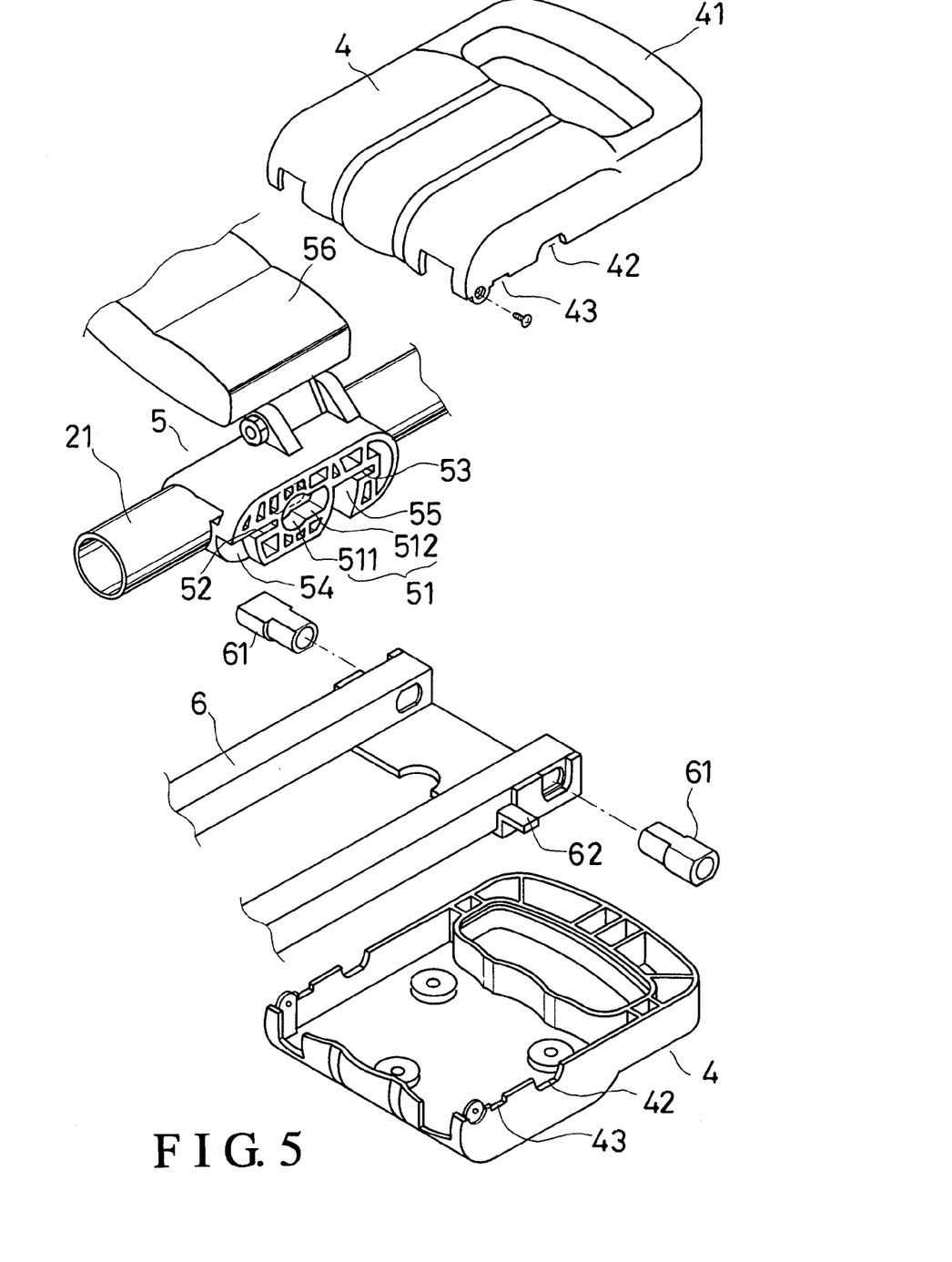
FIG. 5 is an exploded perspective view of the folding mechanism according to the present invention.

Referring to FIGS. 4 and 5, a preferred embodiment of a golf cart includes a frame 2, a front wheel 3, two covering members 4, two locating members 5, and a front wheel support 6.

The frame 2 includes two main support rods 21, which are positioned apart and substantially parallel.

Each locating member 5 has a connecting hole 51 on a middle portion of an inward side, a first engaging trench 52 on a lower end of the inward side, a second engaging trench 53 on an upper end of the inward side, and two curved guide spaces 54 and 55 on the inward side, which communicate with the engaging trenches 52 and 53 respectively; the connecting hole 51 includes a round pivotal portion 511 at a lower end, and a limiting portion 512 at an upper end, which is defined by two opposing straight sides. The two locating members 5 are respectively securely connected to lower ends of the two main support rods 21 with the inward sides thereof facing each other.

The front wheel support 6 includes two rod portions, which are apart and substantially parallel, and each has a connecting bar 61 projecting sideways from an upper end of an outward lateral side, and an engaging peg 62 projecting sideways from a portion of the outward lateral side that is a certain distance from the upper end. Each connecting bar 61 is formed with two straight sides, which face opposite directions. And, the engaging pegs 62 have such a shape as to fit the engaging trenches 52 and 53 of the locating members 5. Furthermore, the front wheel support 6 has a support portion 63 secured to an upper end thereof for supporting a golf bag on. The front wheel support 6 is arranged between the locating members 5 at the upper portion thereof with the connecting bars 61 passing into respective ones of the connecting holes 51.

The front wheel 3 is positioned between the rod portions of the front wheel support 6, and connected to lower ends of the same.

Each of the covering members 4 has a handle portion 41, and two opposing gaps 42 and two opposing gaps 43 on lateral sides thereof. The two covering members 4 are respectively positioned over upper and lower sides of an upper portion of the front wheel support 6, and secured together to form a housing for the upper portion of the support 6 such that the connecting bars 61 project out from the gaps 42, and the engaging pegs 62 project out from the gaps 43.

In addition, each of the locating members 5 has a respective clamping member 56 pivoted on a front side thereof; thus, a golf bag can be held steady between the clamping members 56 after it is supported on the golf bag support portion 63 of the front wheel support 6.

Figure 6:
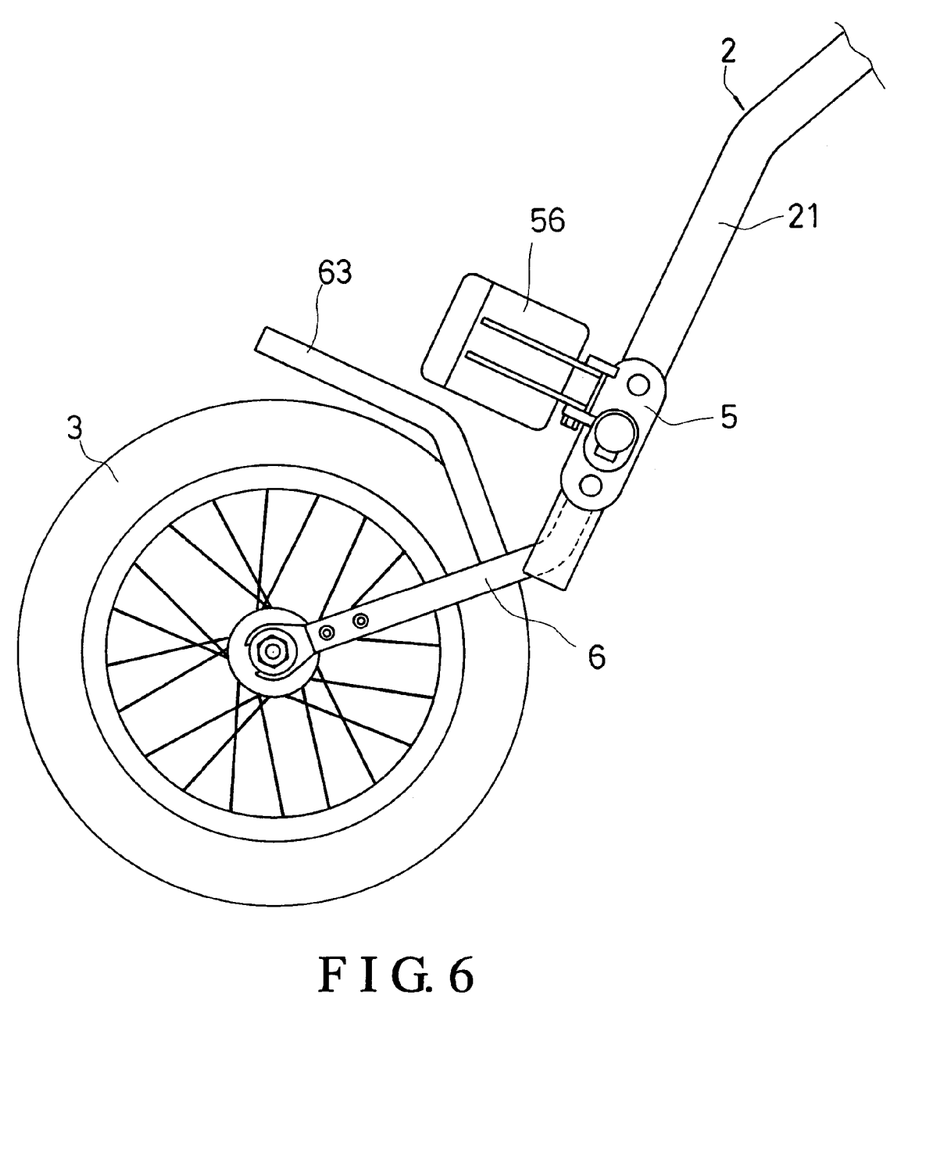
FIG. 6 is a partial side view of the golf cart of the invention.
Figure 7:
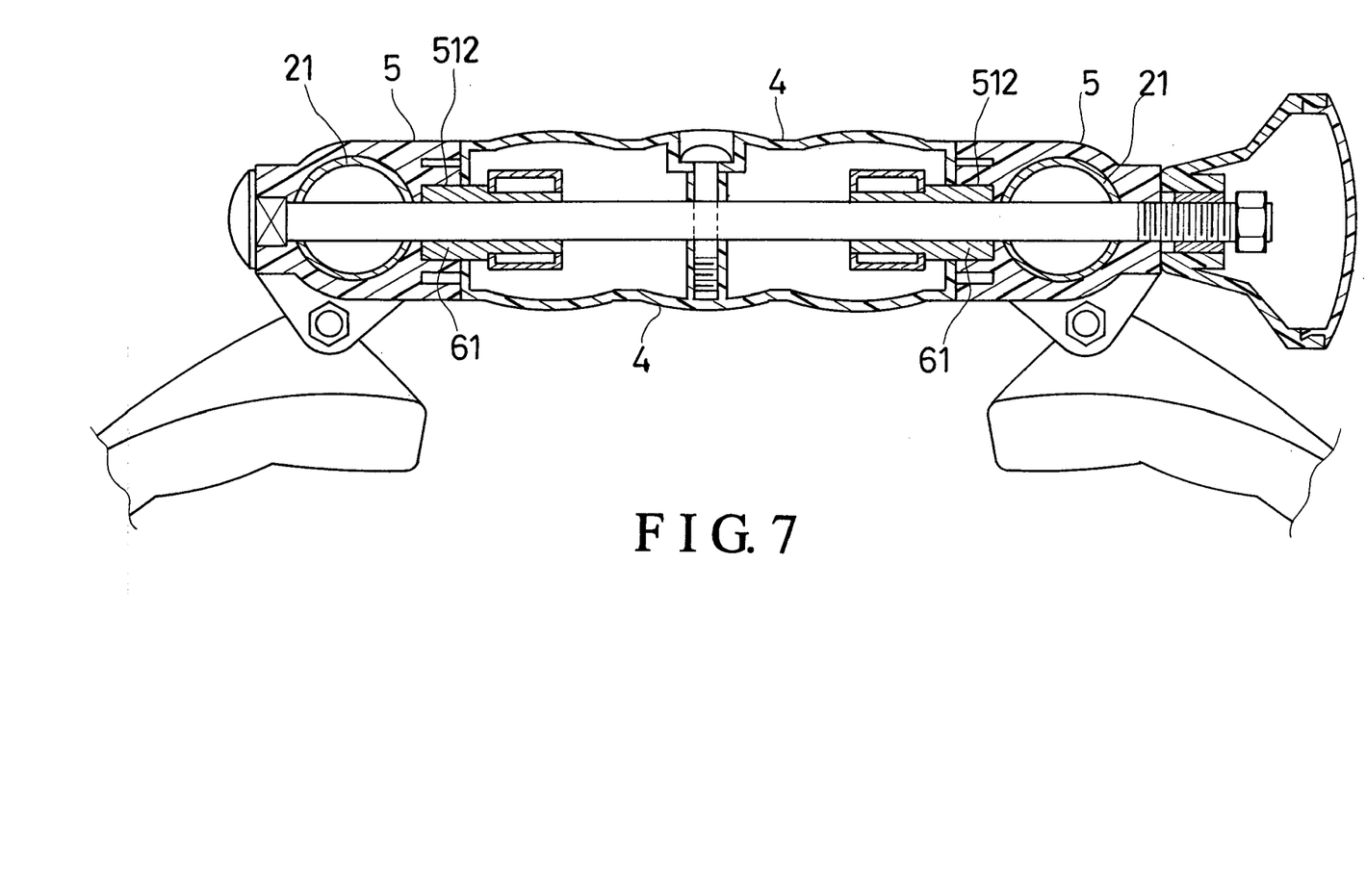
FIG. 7 is a top view of the folding mechanism of the invention.
Figure 8:
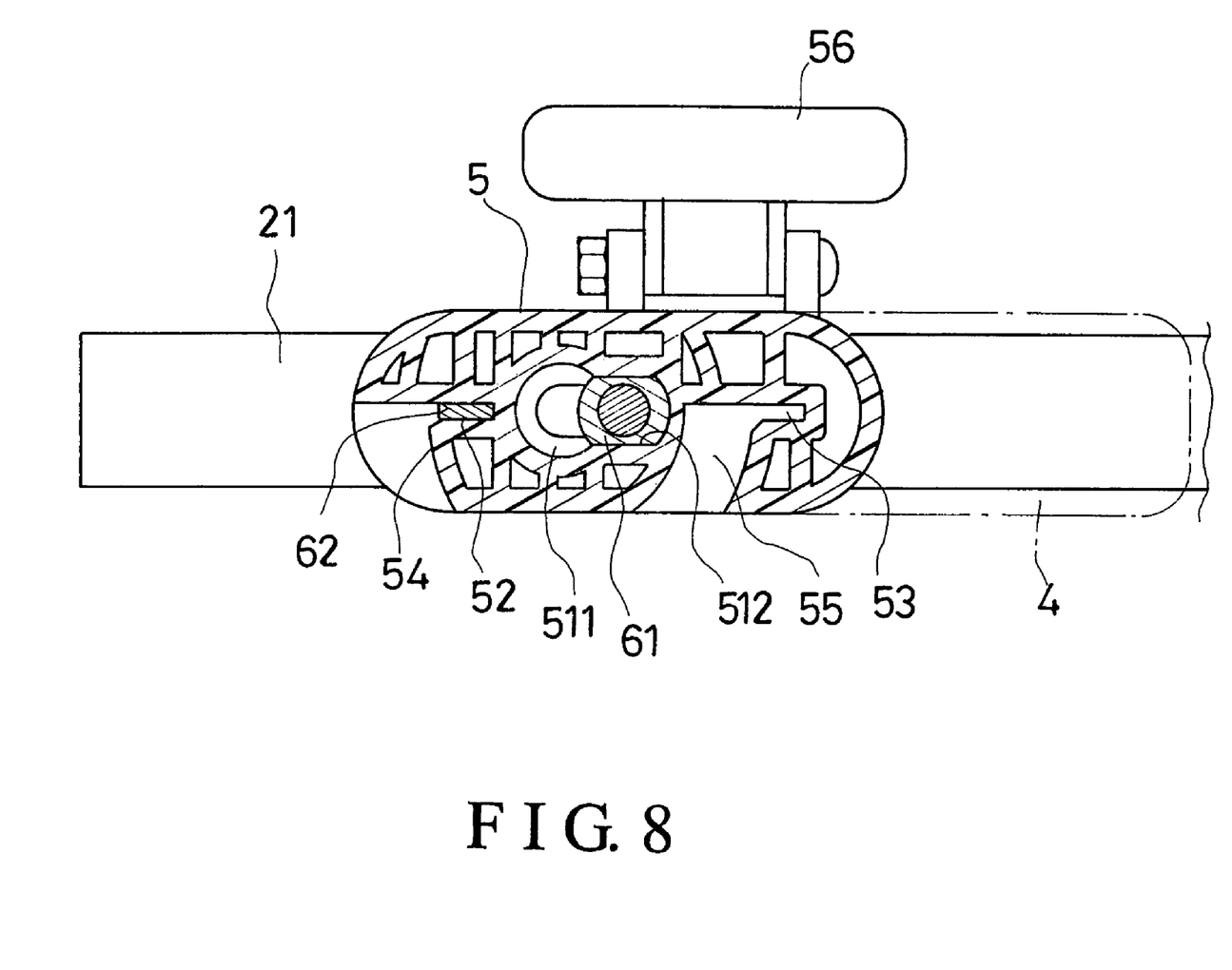
FIG. 8 is a side view of the folding mechanism of the invention.
Figure 9:
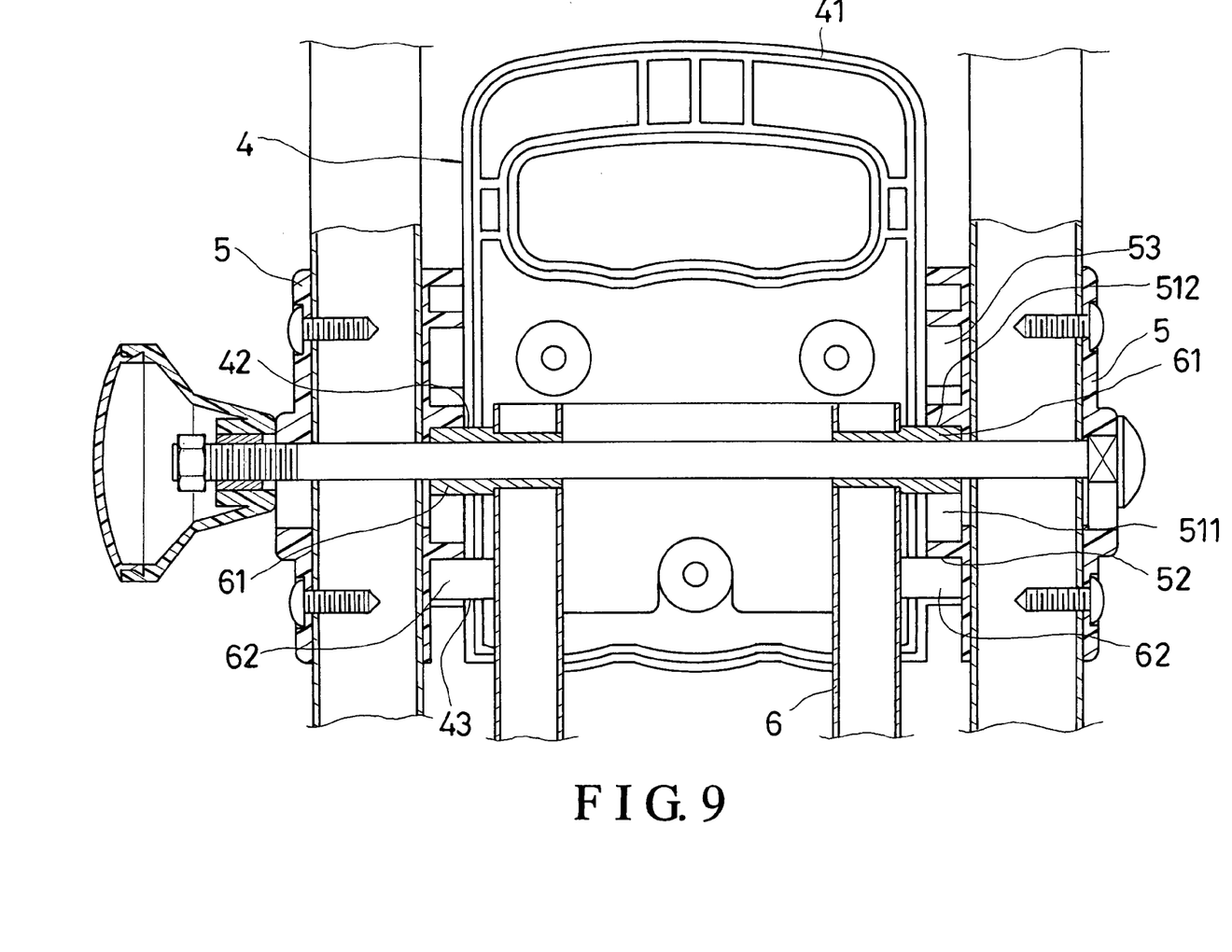
FIG. 9 is a cross-sectional view of the folding mechanism of the present invention.

Referring to FIGS. 6 and 8, the engaging pegs 62 of the front wheel support 6 will be fitted in the engaging trenches 52 of the locating members 5, and the connecting bars 56 in the limiting portions 512 of the connecting holes 51 with the straight sides thereof touching the opposing straight sides defining the limiting portions 512 when the front wheel 3 is in the stretched in-use position; thus, the front wheel support 6 can't move relative to the locating members 5.

Figure 10:
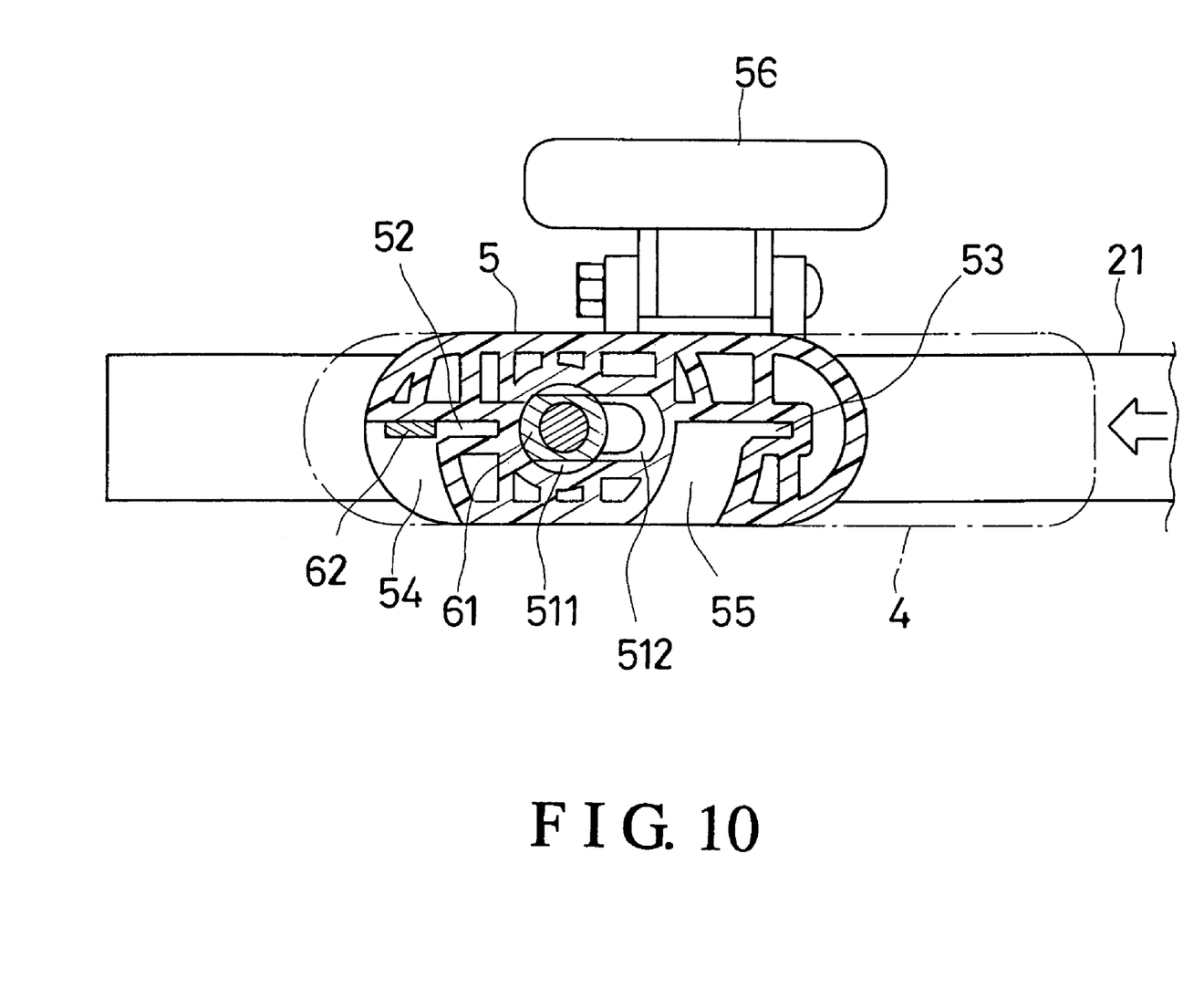
FIG. 10 is a side view of the present folding mechanism under a folding action (1)
Figure 11:
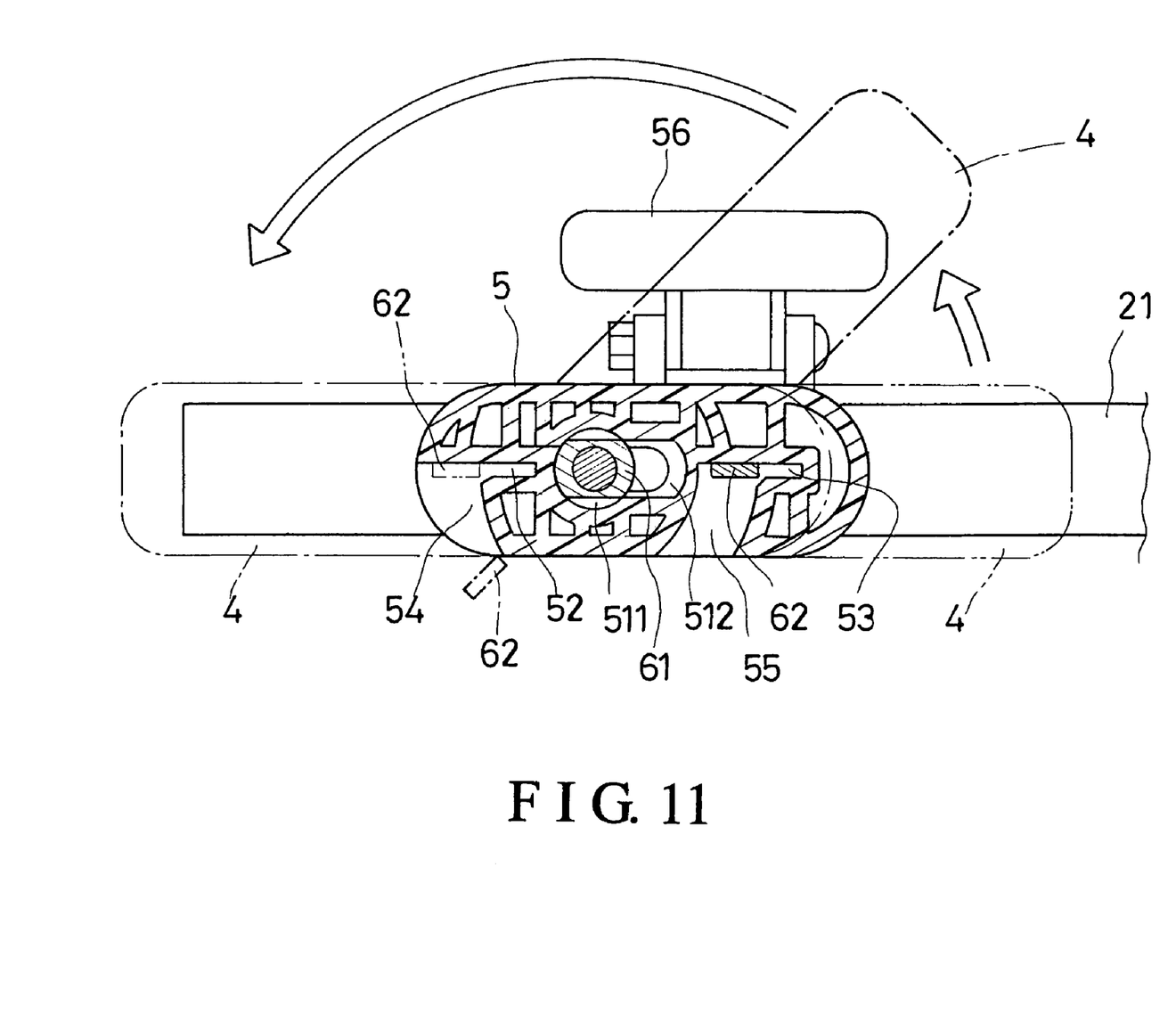
FIG. 11 is a side view of the present folding mechanism under a folding action (2)
Figure 12:
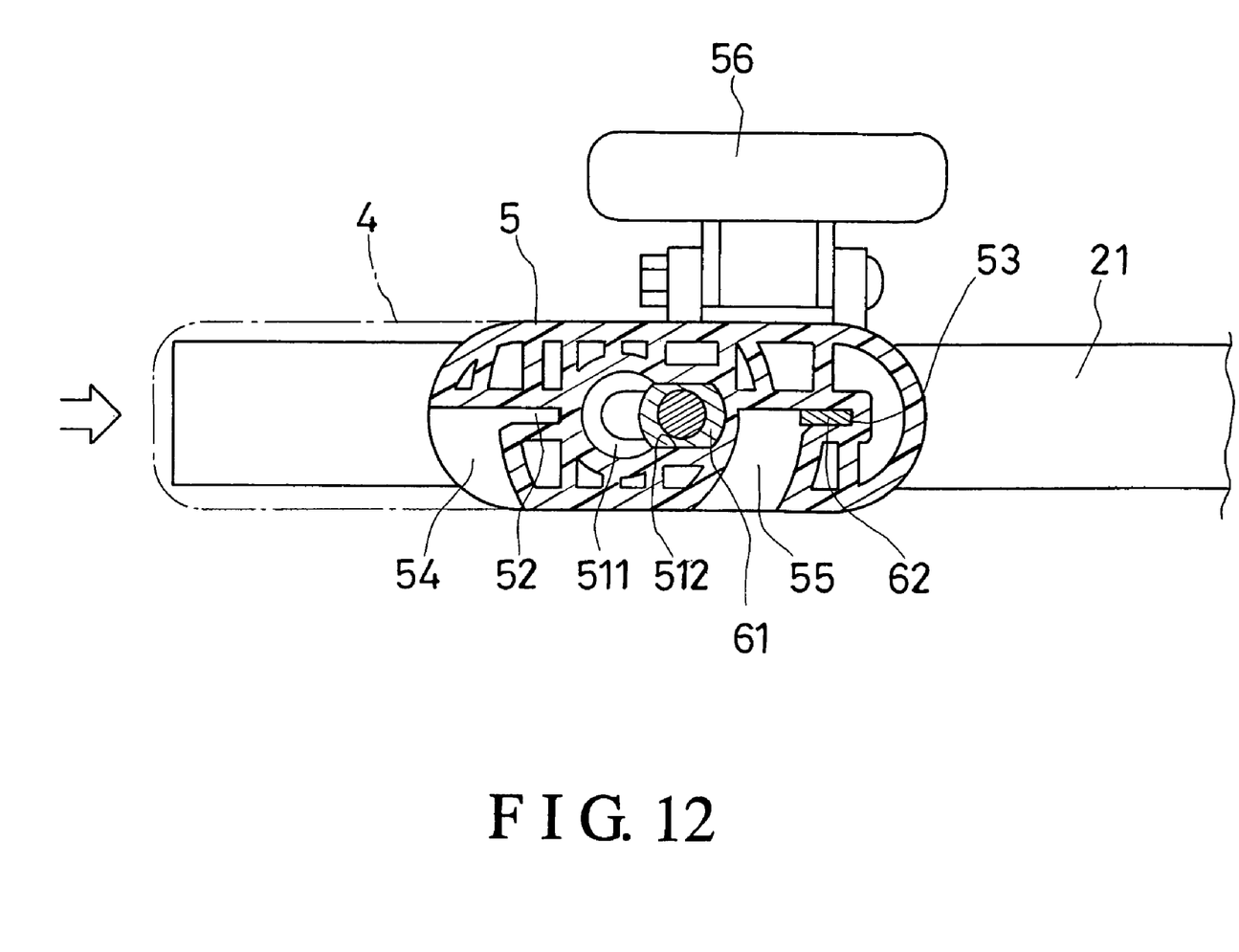
FIG. 12 is a side view of the present folding mechanism under a folding action (3)
Figure 13:
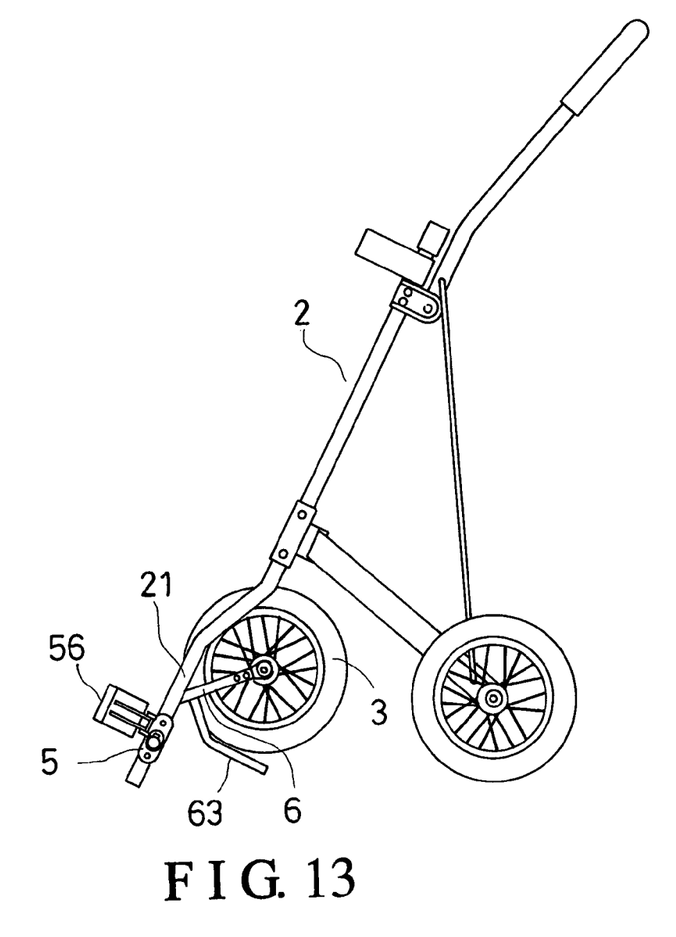
FIG. 13 is a side view of the golf cart of the present invention, with the front wheel in the folded position.
Figure 14:
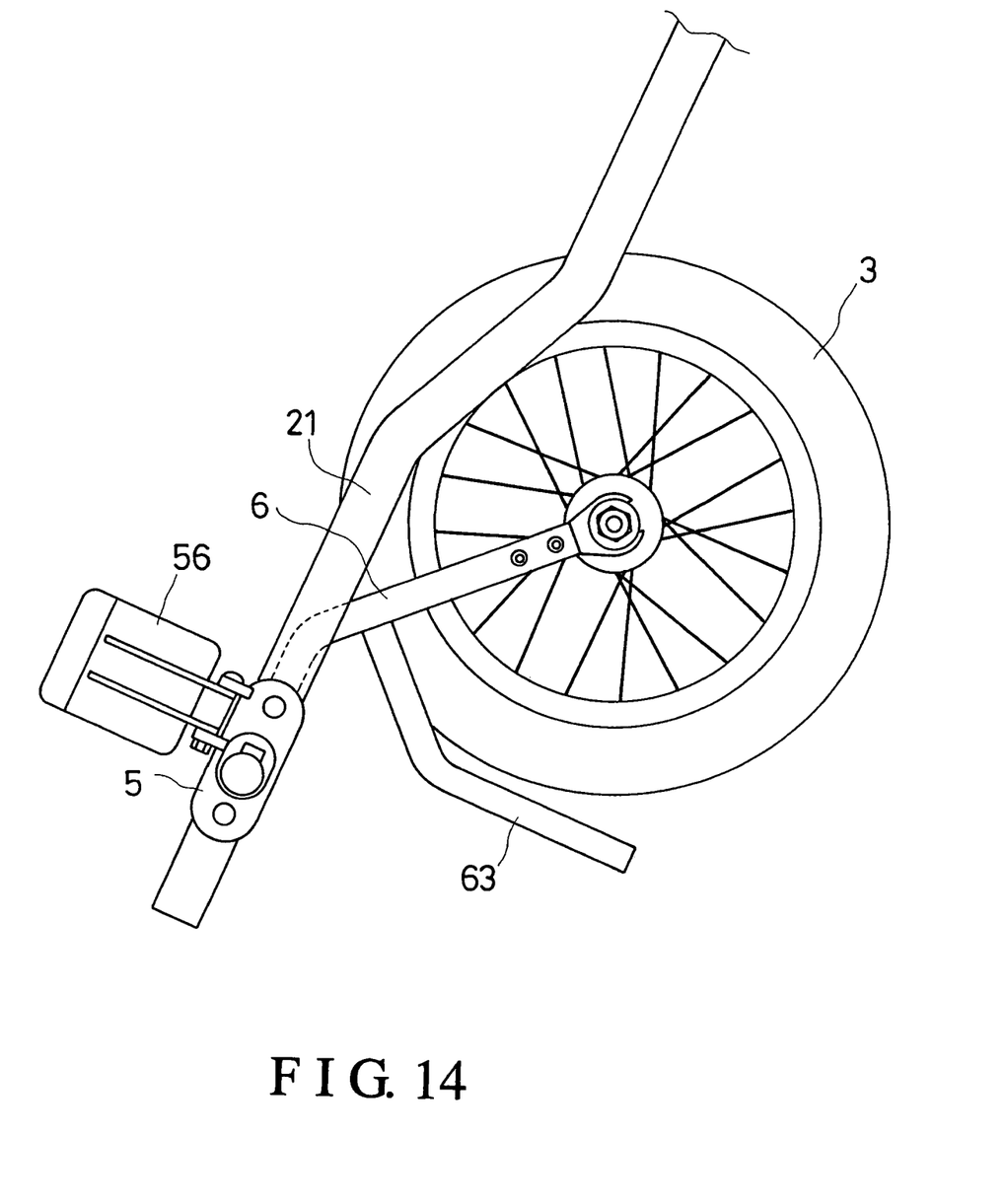
FIG. 14 is a partial side view of the golf cart of the present invention, with the front wheel in the folded position.

Referring to FIGS. 10, 11, and 12, the user pushes the covering members 4 downwards in the direction parallel to the main support rods 21 such that the engaging pegs 62 move outside the engaging trenches 52, and the connecting bars 61 move into the pivotal portions 511 of the connecting holes 51. Next, the covering members 4 are turned around one hundred and eighty degrees such that the pegs 62 move to the edges of the curved guide spaces 55 to face the engaging trenches 53; while the covering members 4 are being angularly displaced, the locating members 5 won't interfere with the movement of the pegs 62 because they are formed with the curved guide spaces 54 and 55. Finally, the covering members 4 are pushed upwards in the direction parallel to the rods 21 such that the engaging pegs 62 move inside the engaging trenches 53, and the connecting bars 61 move into the limiting portions 512 of the connecting holes 51. Thus, the front wheel support 6 is held steady in the folded position, as shown in FIGS. 13 and 14.

To use the front wheel after it has been moved to the folded position, the user has to pull the covering members 4 in the direction parallel to the main rods 21; thus, the pegs 62 separate from the engaging trenches 53, and the connecting bars 61 are in the pivotal portions 511 of the connecting holes 51. And, the covering members 4 are turned around one hundred and eighty degrees, and they are pushed upwards to make the pegs 62 fitted in the trenches 52; thus, the front wheel is steady in the stretched position.

From the above description, it can be easily understood that the folding structure of a front wheel of a golf cart of the present invention has advantages as followings:

1. The front wheel can be angularly displaced together the front wheel support after the pegs 62 are disengaged from the trenches 52, 53 by means of moving the covering members in the direction parallel to the main rods 21. And, the front wheel can be smoothly moved between the folded position and the stretched one without unnecessary obstacles or damage to the wheel support and the locating members. Therefore, the front wheel is convenient to use.
2. The front wheel can be rapidly and exactly moved to the folded position and the stretched position because the engaging pegs will be certainly stopped at the edges of the curved guide spaces of the locating members in a pivotal movement of the front wheel support.
3. After the front wheel support is located in the stretched position, it will be steady, even if the golf cart is shaking while moving along an uneven ground, because of the connection between the engaging pegs and the engaging trenches and that between the connecting bars and the limiting portions of the connecting holes.

What is claimed is:

1. A folding golf cart, comprising
   a frame including two main support rods, which are positioned apart and substantially parallel;
   a front wheel; and
   a mechanism used for displacing the front wheel between a stretched in-use position and a folded position as well as for holding the front wheel in position; the displacing mechanism including:
   (1) two locating members respectively secured to lower ends of the main support rods; each locating member having first and second engaging trenches on an inward side thereof; each locating member having a connecting hole between the first and the second engaging trenches, which hole has a pivotal portion, and a limiting portion communicating with the pivotal portion; each locating member having first and second curved guide spaces on the inward side, which communicate with the first and the second trenches respectively;
   (2) a front wheel support, on which the front wheel is supported; the front wheel support having two connecting bars projecting sideways from two lateral sides thereof; the front wheel support having two engaging pegs projecting sideways from the lateral sides; the front wheel support being arranged between the locating members at an upper portion thereof with the connecting bars being respectively held in the connecting holes of the locating members; the connecting bars and the limiting portions of the connecting holes having such a shape that the front wheel support can't turn relative to the locating members when the connecting bars are held in the limiting portions of the connecting holes; the connecting bars being capable of turning relative to the locating members when they are held in the pivotal portions of the connecting holes; the engaging pegs having such a shape as to fit the engaging trenches; and (3) two covering members respectively positioned over upper and lower sides of the upper portion of the front wheel support; the covering members being secured together to form a housing, in which the upper portion of the wheel support is held, and from which the connecting bars and the engaging pegs project out;

the engaging pegs being going to be fitted in the engaging trenches of the locating members as soon as the front wheel support is linearly displaced relative to the locating members so as to fit the connecting bars into the limiting portions of the connecting holes, preventing the front wheel support from being angularly displaced relative to the locating members;

the engaging pegs being going to be apart from the engaging trenches as soon as the front wheel support is linearly displaced relative to the locating members so as to relocate the connecting bars in the pivotal portions of the connecting holes, allowing the front wheel support to be angularly displaced relative to the locating members;

the front wheel will be held in the stretched in-use position as soon as the engaging pegs of the front wheel support are respectively fitted in the first engaging trenches of the locating members, and the connecting bars in the limiting portions of the connecting holes;

the front wheel will be held in the folded position as soon as the engaging pegs of the front wheel support are respectively fitted in the second engaging trenches, and the connecting bars in the limiting portions of the connecting holes.

2. The folding golf cart as claimed in claim 1, wherein each covering member is formed with a handle portion at one end.

3. The folding golf cart as claimed in claim 1, wherein the locating members have clamping members pivoted on front sides thereof for holding a golf bag in between.

4. The folding golf cart as claimed in claim 1, wherein the front wheel support has a support portion at an upper end thereof for supporting a golf bag on.

* * * * *